Feb. 14, 1967   G. P. R. FARR   3,304,128
HYDRAULIC BRAKING SYSTEMS FOR VEHICLES
Filed Aug. 17, 1964
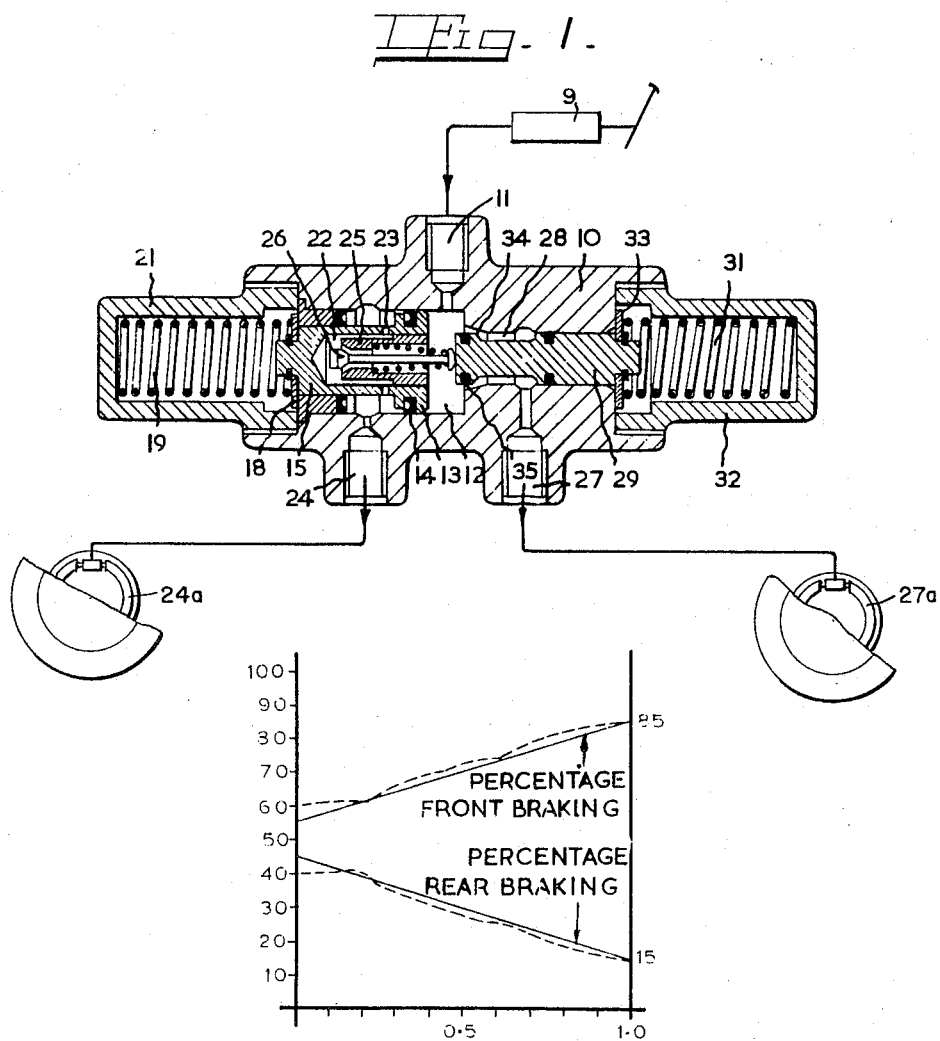
Glyn Phillip Reginald Farr
By Scrivener Parker Scrivener & Clarke United States Patent Office 3,304,128
Patented Feb. 14, 1967

3,304,128
HYDRAULIC BRAKING SYSTEMS FOR VEHICLES
Glyn Phillip Reginald Farr, Kenilworth, England, assignor to Girling Limited, Birmingham, England, a British company
Filed Aug. 17, 1964, Ser. No. 390,138
Claims priority, application Great Britain, Aug. 20, 1963, 28,825/63
3 Claims. (Cl. 303—6)

This invention relates to improvements in hydraulic braking systems for vehicles.

It is common practice to arrange for the wheels on the front axle of a vehicle to take a greater proportion of the braking effort than the rear wheels. The usual ratio is of the order of 60% to 40% and can be achieved by using slave cylinders of suitable cross-sectional areas for applying the brakes on the front and rear wheels.

When a vehicle is being rapidly decelerated there is a transfer of weight from the rear wheels to the front wheels and for optimum braking the percentage of the braking effort taken by the front wheels should increase with the rate of deceleration.

The optimum ratio between the braking on the front and rear wheels can be readily calculated for different decelerations, and for any particular vehicle the graphs of percentage front and percentage rear braking are straight lines.

According to our invention, in an hydraulic braking system for a vehicle fluid is supplied from a master cylinder or other source of fluid under pressure to slave cylinders for applying the brakes on different pairs or sets of wheels respectively through a chamber or housing, incorporating means whereby, when the pressure of the fluid supplied by the master cylinder exceeds a predetermined value, the pressure of the fluid supplied to the slave cylinders of the brakes on one pair or set of wheels is progressively increased.

The slave cylinders of the brakes on the other wheels may continue to receive fluid at line pressure or, alternatively, means may be incorporated whereby when the line pressure reaches a predetermined higher value communication with the slave cylinders of the rear wheel brakes is limited or cut off and the braking effort on the said other wheels does not increase further and becomes a smaller percentage of the total braking effort.

One form of control for the brakes of a four-wheeled vehicle in accordance with our invention is illustrated by way of example in the accompanying drawings in which:

FIGURE 1 is a longitudial section of the control valve; and

FIGURE 2 is a graph showing the distribution of the braking effort between the front and rear wheels of a vehicle at different decelerations.

In the control illustrated 10 is the valve body having an inlet connection 11 through which fluid from a master cylinder or the like 9 is supplied to the inner end of a bore 12 in the body. A piston 13 working in the bore and provided with a seal 14 has an outwardly extending stem 15 of reduced diameter working through a stationary seal 16 and a sleeve 17 fixed in the bore, the piston and stem forming a differential piston. The outer end of the stem projects through the sleeve and carries a stop washer or plate 18 normally held in engagement with the outer end of the sleeve 17 by a preloaded spring 19 located in a hollow cap 21 screwed on to the body.

An axial recess 22 extends into the piston and stem from the inner end and radial ports 23 in the stem normally allow fluid to pass from the inner end of the bore to an outlet 24 leading to the slave cylinders of the brakes on the front wheels 24a of a vehicle. Mounted in the recess there is a hollow sleeve 25 having an axial passage controlled by a spring-loaded valve 26 which is normally open but closes on outward movement of the piston.

Fluid is supplied to the slave cylinders of the brakes on the rear wheels 27a through a port 27 leading out of an axial bore 28 of smaller diameter in alignment with and opening at its inner end into the first bore.

Working in the bore 28 is a plunger 29 urged inwardly by a preloaded spring 31 housed in a cap 32, the spring normally holding a stop washer 33 fixed on the outer end of the plunger against a shoulder at the end of the body. In this position of the plunger fluid can flow from the inlet connection 11 to the outlet port 27 around the inner part of the plunger which is of smaller diameter than the bore.

On its inner extremity the plunger has an enlarged head 34 which is of the same diameter as the bore and carries an annular seal 35, this head normally being spaced inwardly from the inner end of the bore.

In the drawing the piston and plunger are shown in the normal positions in which they are held by the springs 19 and 31 when the system is not under pressure. The axial length of the plunger 29 is such that its inner end abuts the inner end of the valve 26 controlling the passage through the sleeve 25 in the piston 13 and the valve is held in the open position.

When the brake pedal is operated fluid is supplied at equal pressures to the slave cylinders of the brakes on the front and rear wheels of the vehicle up to a predetermined pressure which may be of the order of 200 lbs. to the square inch.

When that pressure is exceeded the fluid acting on the inner end of the piston 13 moves the piston outwardly so that the valve member 26 closes the passage through the piston, and on continued movement of the piston an intensified pressure is applied to the slave cylinders of the front wheel brakes owing to the fact that the area of the outer face of the piston is less than that of the inner face on which the line pressure is acting.

Meanwhile line pressure is applied to the slave cylinders of the rear wheel brakes through the outler port 27 until the line pressure reaches a predetermined higher value which may be of the order of 375 lbs. per square inch. This pressure is sufficient to move the plunger 29 outwardly and the head 34 on its inner end enters and closes the inner end of the bore 28 so that no further fluid can pass to the outlet 27 leading to the rear brakes.

However, by increasing the effort applied to the pedal the pressure applied to the slave cylinders of the front wheel brakes can be increased to any desired value up to a maximum so that the proportion of the total braking effort taken by the front wheels increases and that taken by the rear wheels decreases.

By selection of appropriate diameters for the piston and plunger and/or appropriate spring loading of the piston and plunger the ratio between the braking on the front and rear wheels can be maintained close to the optimum for all decelerations.

FIGURE 2 is a graph showing the distribution of the braking effort between the front and rear wheels of a vehicle in a system fitted with our improved control. The deceleration up to a maximum of 1.0 g. is plotted horizontally and the desired braking on the front and rear wheels is plotted vertically. The solid lines indicate the optimum theoretical distributions of the braking effort between the front and rear wheels to produce the maximum retardation of the vehicle without skidding of any of the wheels.

The dotted lines shown the distribution obtained under test with our improved control in a system in which the diameter of the slave cylinders in the brakes on the front and rear wheels are such as to give a static ratio of 60% braking on the front wheels to 40% on the rear wheels.

It will be seen from the graph that the results obtained approximate closely to the theoretical optimum, the distribution at a deceleration equal to 1.0 g. being 85% on the front wheels and 15% on the rear wheels.

In an hydraulic braking system for a four-wheeled vehicle such as a passenger car or a light van the unit will normally be arranged to increase the pressure applied to the brakes on the front wheels when the master cylinder pressure exceeds a predetermined value and to cut off the supply of hydraulic fluid to the brakes on the rear wheels when that pressure exceeds another and higher value.

However our invention can also be applied to articulated lorries or trucks and to transporters and other heavy vehicles in which there is a different distribution of weight on the various wheels or axles, so that the application of the control is not limited to its use on a four-wheeled vehicle as described above with reference to the accompanying drawings.

I claim:

1. Means for controlling the ratio of the braking efforts applied to different pairs or sets of wheels of a vehicle comprising a chamber or housing adapted to be connected to a master cylinder and to the slave cylinders of the brakes on two pairs or sets of wheels respectively and incorporating means for applying an intensified pressure to the slave cylinders of the brakes on one pair or set of wheels when the master cylinder pressure exceeds a predetermined value and further means for cutting off communication between the master cylinder and the slave cylinders of the brakes on the other pair or set of wheels when the master cylinder pressure exceeds another predetermined value.

2. Means as claimed in claim 1 in which the means for applying an intensified pressure to the slave cylinders of the brakes on the first pair or set of wheels comprises a bore in the housing connected at its inner end to the master cylinder and at its outer end to the slave cylinders, a differential piston working in the bore with its larger inner end exposed to the master cylinder pressure, a passage through the piston controlled by a normally open spring-loaded valve, and a preloaded spring acting on the piston to hold it at the inner end of its movement in which position the valve is held open, the valve closing automatically when the piston is moved outwardly by the master cylinder pressure after that pressure reaches a predetermined value.

3. Means as claimed in claim 1 in which the means for cutting off communication between the master cylinder and the wheel cylinders of the brakes on the second pair or set of wheels comprises a bore connected at its inner end to the master cylinder and controlled by a plunger which is exposed at one end to the master cylinder pressure and is normally held by a preloaded spring in a position in which it permits flow through the bore.

References Cited by the Examiner

UNITED STATES PATENTS

| | | | |
|---|---|---|---|
| 2,207,173 | 7/1940 | Goepfrich | 188—152 |
| 2,399,270 | 4/1964 | Vickers | 60—54.5 |
| 3,169,800 | 2/1965 | Oberthur | 303—22 |

EUGENE G. BOTZ, *Primary Examiner.*